United States Patent
Liu et al.

(10) Patent No.: US 10,133,402 B2
(45) Date of Patent: Nov. 20, 2018

(54) DISPLAY PANEL, METHOD FOR DRIVING THE SAME AND DISPLAY DEVICE

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Yingming Liu, Beijing (CN); Xue Dong, Beijing (CN); Haisheng Wang, Beijing (CN); Xiaochuan Chen, Beijing (CN); Xiaoliang Ding, Beijing (CN); Liguang Deng, Beijing (CN); Huizhong Zhu, Beijing (CN)

(73) Assignees: BOE TECHNOLOGY GROUP CO., LTD. (CN); BEIJING BOE OPTOELECTRONICS TECHNOLOGY CO., LTD. (CN)

( * ) Notice: Subject to any disclaimer, the term of this patent is extended or adjusted under 35 U.S.C. 154(b) by 57 days.

(21) Appl. No.: 15/233,401

(22) Filed: Aug. 10, 2016

(65) Prior Publication Data
US 2017/0249044 A1    Aug. 31, 2017

(30) Foreign Application Priority Data
Feb. 26, 2016    (CN) .......................... 2016 1 0108567

(51) Int. Cl.
*G06F 3/045*    (2006.01)
*G06F 3/041*    (2006.01)
(Continued)

(52) U.S. Cl.
CPC ........ *G06F 3/0416* (2013.01); *G02F 1/13338* (2013.01); *G02F 1/134309* (2013.01);
(Continued)

(58) Field of Classification Search
CPC ........... G02F 1/133345; G02F 1/13338; G02F 1/133514; G02F 1/134309; G02F 1/13439;
(Continued)

(56) References Cited

U.S. PATENT DOCUMENTS 9,360,981 B2 *  6/2016  Hwang ................. G06F 3/0412
9,448,679 B2 *  9/2016  Lee ......................... G06F 3/044
(Continued)

*Primary Examiner* — Michael J Jansen, II
(74) *Attorney, Agent, or Firm* — Brooks Kushman P.C.

(57) ABSTRACT

The present disclosure discloses a display panel, a method for driving the same and a display device. The display panel includes a display panel including a first substrate and a second substrate arranged opposite to each other. The first substrate includes: a first base, and voltage-fixed electrodes that are arranged on the first base at a side facing the second substrate. A fixed voltage is applied to each of the voltage-fixed electrodes. The second substrate includes: a second base, and pressure sensing electrodes that are arranged on the second base at a side facing the first substrate. The pressure sensing electrodes are arranged opposite to the voltage-fixed electrodes respectively, and configured to detect a pressure applied at a touch position on the display panel according to capacitances between the pressure sensing electrodes and the corresponding voltage-fixed electrodes at a pressure detection stage.

20 Claims, 5 Drawing Sheets

(51) Int. Cl.
*G06F 3/044* (2006.01)
*G02F 1/1343* (2006.01)
*G02F 1/1362* (2006.01)
*G02F 1/1333* (2006.01)
*G02F 1/1335* (2006.01)

(52) U.S. Cl.
CPC ........ *G02F 1/136286* (2013.01); *G06F 3/044* (2013.01); *G06F 3/0412* (2013.01); *G02F 1/13439* (2013.01); *G02F 1/133345* (2013.01); *G02F 1/133514* (2013.01); *G02F 2001/136295* (2013.01); *G02F 2201/121* (2013.01); *G02F 2201/123* (2013.01); *G06F 2203/04105* (2013.01)

(58) Field of Classification Search
CPC ... G02F 1/136286; G02F 2001/136295; G02F 2201/121; G02F 2201/123; G06F 2203/04105; G06F 3/0412; G06F 3/0416; G06F 3/044; G06F 3/0414
See application file for complete search history.

(56) References Cited

U.S. PATENT DOCUMENTS

| | | | | |
|---|---|---|---|---|
| 9,563,303 B2* | 2/2017 | Zhou | | G06F 3/0412 |
| 9,678,589 B2* | 6/2017 | Hwang | | G06F 3/0412 |
| 9,733,760 B2* | 8/2017 | Kim | | G06F 3/0416 |
| 9,798,416 B2* | 10/2017 | Hsiao | | G06F 3/0416 |
| 9,864,459 B2* | 1/2018 | Kim | | G06F 3/044 |
| 9,880,649 B2* | 1/2018 | Agarwal | | G06F 3/0412 |
| 9,910,525 B2* | 3/2018 | Ding | | G06F 3/0412 |
| 9,971,449 B2* | 5/2018 | Ding | | G06F 3/0416 |
| 2015/0338963 A1* | 11/2015 | Lee | | G06F 3/044 |
| | | | | 345/174 |
| 2016/0062504 A1* | 3/2016 | Hwang | | G06F 3/0412 |
| | | | | 345/174 |
| 2016/0092010 A1* | 3/2016 | Agarwal | | G06F 3/0412 |
| | | | | 345/173 |
| 2016/0216833 A1* | 7/2016 | Butler | | G06F 3/0412 |
| 2016/0274708 A1* | 9/2016 | Hwang | | G06F 3/0412 |
| 2016/0342256 A1* | 11/2016 | Zhou | | G06F 3/0412 |
| 2017/0045992 A1* | 2/2017 | Lee | | G06F 3/0416 |
| 2017/0068368 A1* | 3/2017 | Hsiao | | G06F 3/0416 |
| 2017/0068376 A1* | 3/2017 | Kim | | G06F 3/0416 |
| 2017/0068377 A1* | 3/2017 | Kim | | G06F 3/0416 |
| 2017/0068384 A1* | 3/2017 | Kim | | G06F 3/0416 |
| 2017/0075493 A1* | 3/2017 | Lee | | G06F 3/0418 |
| 2017/0097700 A1* | 4/2017 | Kim | | G06F 3/044 |
| 2017/0115768 A1* | 4/2017 | Shih | | G06F 3/044 |
| 2017/0115812 A1* | 4/2017 | Lin | | G06F 3/0416 |
| 2017/0123540 A1* | 5/2017 | Shih | | G06F 3/0412 |
| 2017/0192565 A1* | 7/2017 | Pan | | G06F 3/0412 |
| 2017/0192582 A1* | 7/2017 | Pan | | G06F 3/0416 |
| 2017/0205924 A1* | 7/2017 | Kim | | G06F 3/0412 |
| 2017/0206393 A1* | 7/2017 | Chia | | G06K 9/0002 |
| 2017/0220183 A1* | 8/2017 | Kim | | G06F 3/0412 |
| 2017/0235400 A1* | 8/2017 | Ding | | G06F 3/0412 |
| | | | | 345/174 |
| 2017/0235414 A1* | 8/2017 | Ding | | G06F 3/0416 |
| | | | | 345/174 |
| 2017/0242524 A1* | 8/2017 | Kim | | G06F 3/0416 |
| 2017/0249044 A1* | 8/2017 | Liu | | G06F 3/0416 |
| 2017/0262125 A1* | 9/2017 | Ding | | G06F 3/0416 |
| 2017/0277321 A1* | 9/2017 | Ding | | G06F 3/0412 |
| 2017/0277329 A1* | 9/2017 | Ding | | G06F 3/0414 |

* cited by examiner

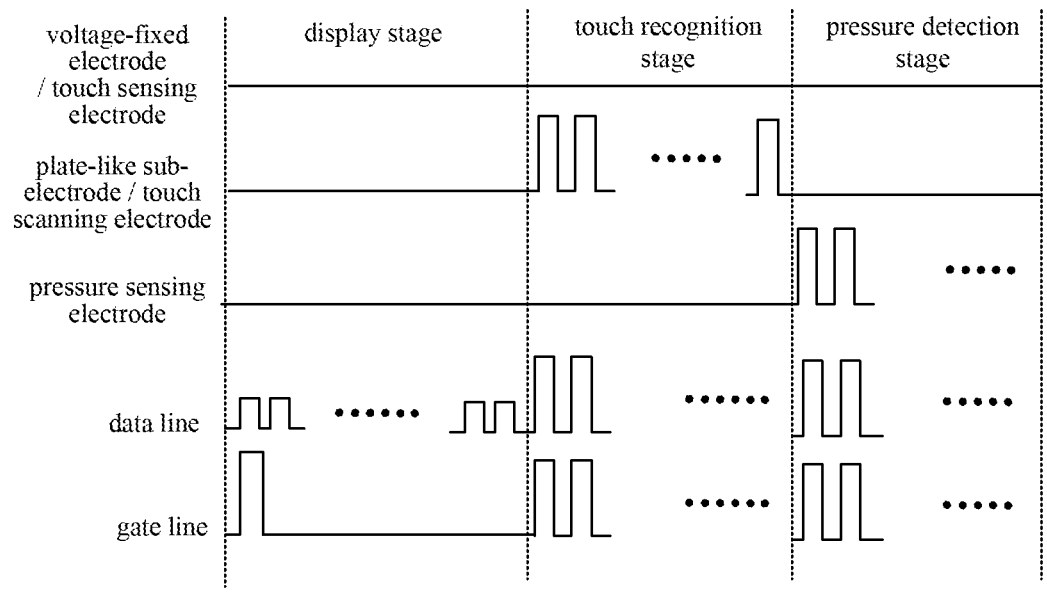

Fig. 5 at the pressure detection stage, applying the fixed voltage to the voltage-fixed electrodes, and inputting pressure scanning signals to the pressure sensing electrodes, so as to generate the pressure sensing signals on the pressure sensing electrodes, thereby to determine by a circuit the pressure applied at the touch position according to the pressure sensing signals. ⎯S3

Fig. 6

DISPLAY PANEL, METHOD FOR DRIVING THE SAME AND DISPLAY DEVICE

CROSS-REFERENCE TO RELATED APPLICATIONS

This application claims priority to Chinese application No. 201610108567.X, filed Feb. 26, 2016, which is hereby incorporated by reference in its entirety.

TECHNICAL FIELD

The present disclosure relates to the field of the display technology, in particular to a display panel, a method for driving the display panel and a display device.

BACKGROUND

The pressure sensing technology is a technique capable of detecting an external stress. Such a technique has been applied in the fields such as the industrial control, the medical treatment and the like for a long time. Currently, in the display field, in particular to the fields of the mobile phone and the tablet computer, the pressure sensing is realized in a manner of adding an extra component at a backlight part of a liquid crystal display panel or a frame of a mobile phone. However, such a design requires changing a whole structure of the liquid crystal display panel or the structure of the mobile phone. In addition, since the assembly tolerance is relatively large, the detection accuracy of such a design is deteriorated.

Therefore, it is desired to realize the pressure detection of high accuracy without changing a whole structure of a display panel.

SUMMARY

An object of the present disclosure is to provide a display panel, a method for driving the display panel and a display device, so as to avoid changing a whole structure of a display device and improve the accuracy of the pressure detection.

In one aspect, the present disclosure provides in some embodiments a display panel, which includes a first substrate and a second substrate arranged opposite to each other, wherein the first substrate includes: a first base, and voltage-fixed electrodes that are arranged on the first base at a side facing the second substrate, wherein a fixed voltage is applied to each of the voltage-fixed electrodes; and the second substrate includes: a second base, and pressure sensing electrodes that are arranged on the second base at a side facing the first substrate, wherein the pressure sensing electrodes are arranged opposite to the voltage-fixed electrodes respectively, and the pressure sensing electrodes are configured to detect a pressure applied at a touch position on the display panel according to capacitances between the pressure sensing electrodes and the corresponding voltage-fixed electrodes at a pressure detection stage.

Alternatively, the second substrate further includes pixel electrodes and a common electrode that are arranged on the second base at the side facing the first substrate, and the pixel electrodes are arranged on the common electrode at a side that is farther away from the second base than the other side of the common electrode; and orthogonal projections of the pressure sensing electrodes on the second base are not overlapped with orthogonal projections of the pixel electrodes on the second base.

Alternatively, the pressure sensing electrodes and the pixel electrode are arranged on a same layer.

Alternatively, the second substrate further includes signal lines, wherein the signal lines are connected to the pressure sensing electrodes through via holes respectively, and configured to input pressure scanning signals to the pressure sensing electrodes and transmit the pressure sensing signals generated by the pressure sensing electrodes to an electronic chip, so that the electronic chip determines the pressure applied at the touch position according to the pressure sensing signals.

Alternatively, the second substrate further includes gate lines and data lines, wherein the signal lines and the gate lines are arranged on a same layer or the signal lines and the data lines are arranged on a same layer.

Alternatively, at a touch recognition stage, the voltage-fixed electrodes function as the touch sensing electrodes, and a predetermined portion of the common electrode functions as touch scanning electrodes.

Alternatively, the voltage-fixed electrodes extend in a first direction. The common electrode includes a plurality of strip-like sub-electrodes and a plurality of plate-like sub-electrodes. The strip-like sub-electrodes are arranged opposite to the voltage-fixed electrodes, all of the plate-like sub-electrodes are arranged in an array including a plurality of electrode groups, and each of the electrode groups includes a plurality of plate-like sub-electrodes arranged in a second direction and electrically connected. At the touch recognition stage, the electrode groups function as the touch scanning electrodes.

Alternatively, a value of the fixed voltage is in a range from 1V to 3V.

Alternatively, both the voltage-fixed electrodes and the pressure sensing electrodes are made of metal.

Alternatively, both the voltage-fixed electrodes and the pressure sensing electrodes are of a grid shape.

Alternatively, the first substrate is a color filter substrate, and the second substrate is an array substrate.

Alternatively, the pixel electrodes are separated from the common electrode by a first insulation layer, and the data lines are separated from the common electrode by a second insulation layer.

In another aspect, the present disclosure provides in some embodiments a method for driving the above display panel. The method includes steps of: at the pressure detection stage, applying the fixed voltage to the voltage-fixed electrodes, and inputting pressure scanning signals to the pressure sensing electrodes, so as to generate the pressure sensing signals on the pressure sensing electrodes, thereby to determine by an electronic chip the pressure applied at the touch position according to the pressure sensing signals.

Alternatively, when the second substrate further includes pixel electrodes and a common electrode that are arranged on the second base at a side facing the first substrate, the method further includes steps of: prior to the pressure detection stage, at a display stage, inputting a common voltage signal to the common electrode, and inputting data signals to the pixel electrodes, so that the display panel displays an image display; and at the touch recognition stage, inputting touch scanning signals to a predetermined portion of the common electrode, and applying the fixed voltage to the voltage-fixed electrodes, so as to generate the touch sensing signals on the voltage-fixed electrodes, thereby to determine by an electronic chip the touch position according to the touch sensing signals In yet another aspect, the present disclosure provides in some embodiments a display device, which includes the above display panel.

In the present disclosure, since both the voltage-fixed electrodes and the pressure sensing electrodes that are used for detecting the pressure are arranged inside the display panel, there is no need to change the whole structure of the display device. In addition, since the voltage-fixed electrodes can effectively prevent a person's finger from affecting capacitances between the voltage-fixed electrodes and the pressure sensing electrodes, the touch detection is of a high accuracy.

DESCRIPTION OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

FIG. 5 illustrates a timing sequence for an operation of the display panel as shown in FIG. 1;

FIG. 6 is a flow chart showing a method for driving the display panel according to at least one embodiment of the present disclosure.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "a" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

Figure 1:
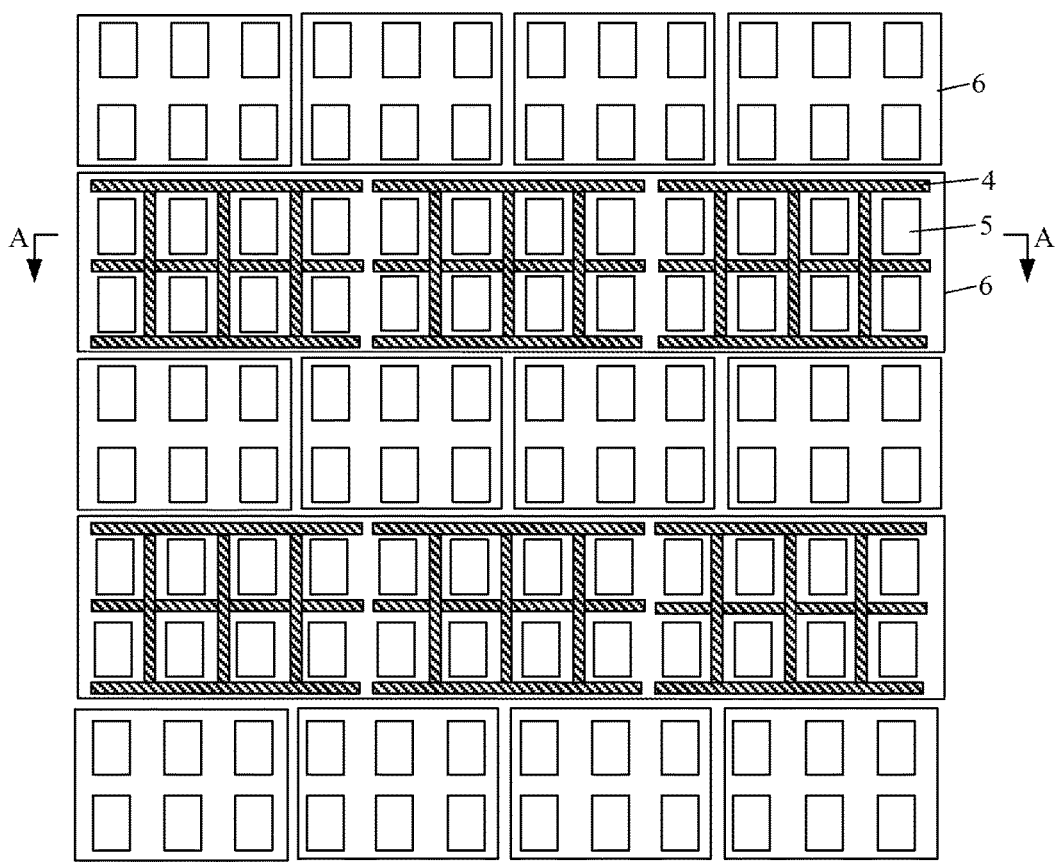
FIG. 1 is a schematic view showing a display panel according to at least one embodiment of the present disclosure.
Figure 2:
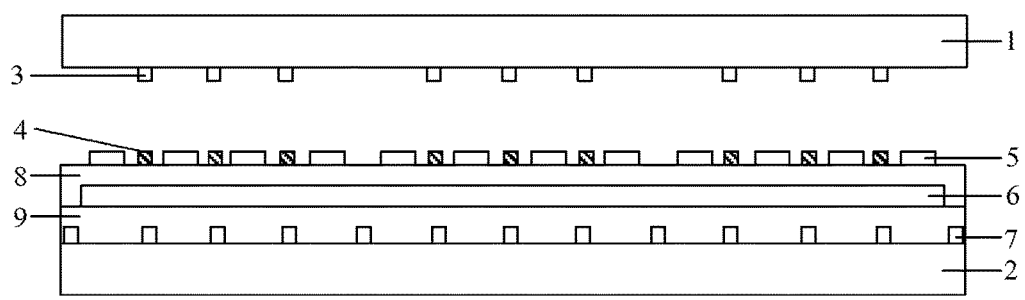
FIG. 2 is a sectional view of the display panel along in a line A-A as shown in FIG. 1.

FIG. 1 is a schematic view showing a display panel according to at least one embodiment of the present disclosure. FIG. 2 is a sectional view of the display panel along in a line A-A as shown in FIG. 1. As shown in FIGS. 1 and 2, the display panel includes a first substrate and a second substrate arranged opposite to each other, wherein the first substrate includes: a first base 1, and voltage-fixed electrodes 3 that are arranged on the first base 1 at a side facing the second substrate, wherein a fixed voltage is applied to each of the voltage-fixed electrodes 3; and the second substrate includes: a second base 2, and pressure sensing electrodes 4 that are arranged on the second base 2 at a side facing the first substrate, wherein the pressure sensing electrodes 4 are arranged opposite to the voltage-fixed electrodes 3 respectively, and the pressure sensing electrodes 4 are configured to detect a pressure applied at a touch position on the display panel according to capacitances between the pressure sensing electrodes 4 and the corresponding voltage-fixed electrodes 3 at a pressure detection stage.

It should be noted that, the second substrate can be an array substrate, and correspondingly, the first substrate 1 is a color filter substrate.

In the display panel shown in FIG. 1, the voltage-fixed electrode 3 and the pressure sensing electrode 4 may form a capacitance. When a user applies a pressure on the first substrate (corresponding to a touch side of the display panel), the first substrate is slightly deformed due to being pressed. Correspondingly, a distance between the voltage-fixed electrode 3 and the pressure sensing electrode 4 may be changed so as to cause a change of a capacitance value between them. At this time, since the fixed voltage is applied to the voltage-fixed electrodes 3, an influence of the user's finger on the pressure sensing electrodes 4 can be shielded, i.e., an influence of the finger on the mutual capacitances between the voltage-fixed electrodes 3 and the pressure sensing electrodes 4 can be effectively prevented. Hence, the distance between the deformed first substrate and the second substrate can be obtained by detecting the capacitance values to obtain a deformation quantity of the first substrate in the touch process (the deformation quantity of the first substrate corresponds to the received pressure), thereby to further obtain the pressure received by the first substrate and realize a pressure sensing.

In this embodiment, a shielding function can be realized by applying only a fixed voltage to the voltage-fixed electrodes 3. For reducing power consumption, the fixed voltage applied to the voltage-fixed electrodes may be a low voltage. Specifically, the fixed voltage ranges from 1V to 3V.

It should be noted that, in the embodiments of the present disclosure, the voltage-fixed electrodes 3 can be made of a conducting material such as Indium Tin Oxide (ITO) or a metal.

In the display panel of the present disclosure, since both the voltage-fixed electrodes 3 and the pressure sensing electrodes 4 that are used for pressure detection are arranged inside the display panel (i.e., the display panel is a built-in display panel), there is no need to change the whole structure of the display device. In addition, since the voltage-fixed electrodes 3 can effectively prevent the finger from influencing the capacitances between the voltage-fixed electrodes 3 and the pressure sensing electrodes 4, the detection result is of a high accuracy.

Figure 3:
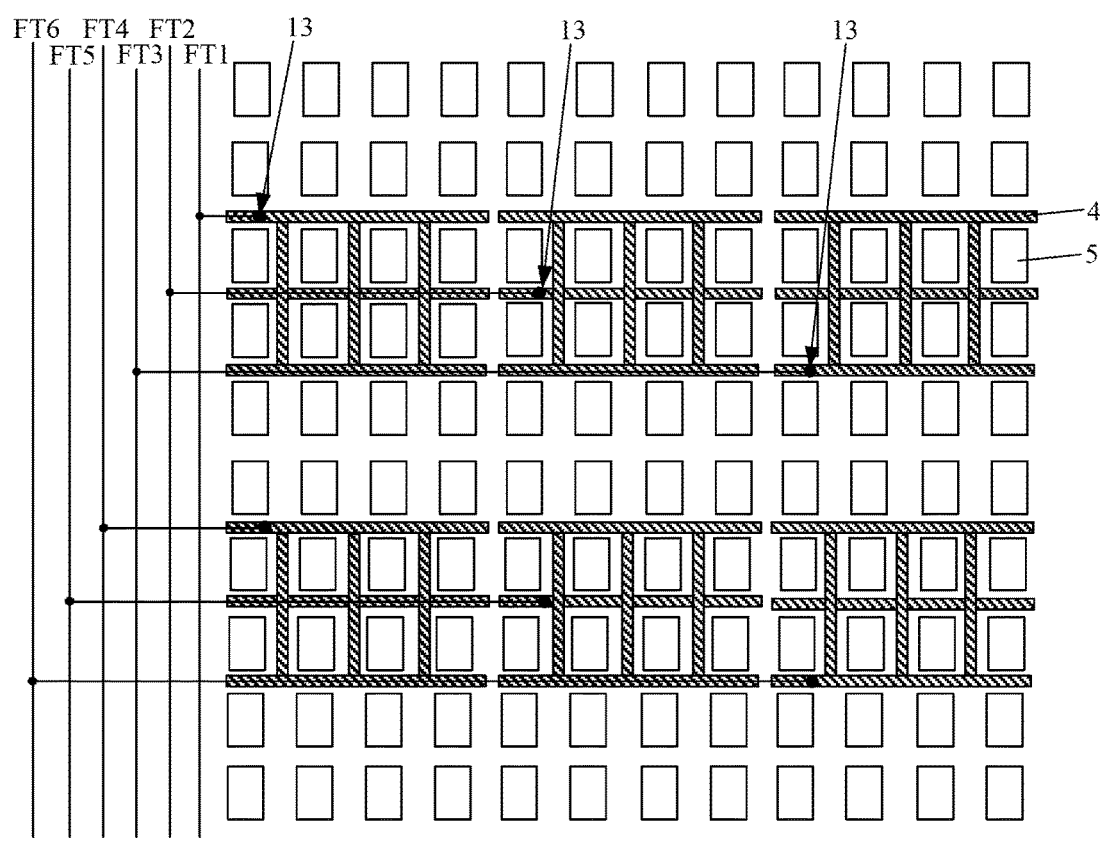
FIG. 3 is a top view showing pixel electrodes and pressure sensing electrodes of FIG. 1.

Alternatively, for enabling the display panel to display an image, alternatively, the second substrate further includes pixel electrodes 5 and a common electrode 6 that are arranged on the second base 2 at the side facing the first substrate, and the pixel electrodes 5 are arranged on the common electrode 6 at a side that is farther away from the second base than the other side of the common electrode 6; and the pixel electrodes 5 are separated from the common electrode 6 by a first insulation layer 8. Orthogonal projections of the pressure sensing electrodes 4 on the second base 2 are not overlapped with orthogonal projections of the pixel electrodes 5 on the second base 2. FIG. 3 is a top view showing the pixel electrodes and the pressure sensing electrodes in FIG. 1. As shown in FIG. 3, all of the pixel electrodes 5 are arranged in an array, and the pressure sensing electrode 4 is of a grid shape. Correspondingly, the voltage-fixed electrode 3 is also of a grid shape, so that the voltage-fixed electrodes 3 are arranged opposite to the pressure sensing electrodes 4.

It should be noted that, both the pixel electrodes 5 and the common electrode 6 are arranged on the second substrate. The display mode of the display panel can be an In-Plane Switching (IPS) mode or an Advanced super Dimension Switch (ADS) mode. When the display mode is the ADS mode, the pixel electrodes are slit electrodes.

Alternatively, the pressure sensing electrodes 4 and the pixel electrode 5 are arranged on a same layer. The pressure sensing electrodes 4 and the pixel electrode 5 are made of ITO. At this time, the pressure sensing electrodes 4 and the pixel electrode 5 can be formed simultaneously in a single-patterning process, so as to reduce the processing procedures.

Alternatively, the second substrate further includes signal lines FT1, FT2 . . . FT6, which are connected to the corresponding pressure sensing electrodes 4 through via holes 13 respectively, and configured to input pressure scanning signals to the pressure sensing electrodes 4 and transmit pressure sensing signals generated by the pressure sensing electrodes 4 to an electronic chip (not shown) so that the electronic chip may determine a pressure applied at the touch position according to the pressure sensing signals.

It should be noted that, in FIG. 3, the number of the pressure sensing electrodes 4 is six and that the number of the signal lines is six, which is for illustration purpose only. During actual implementation, the number of the pressure sensing electrodes 4 and the number of the signal lines FT1, FT2 . . . FT6 can be adjusted according to actual requirements.

In addition, the second substrate further includes gate lines (not shown) and data lines 7, and the signal lines FT1, FT2 . . . FT6 and the gate lines may be arranged on a same layer or the signal lines FT1, FT2 . . . FT6 and the data lines 7 may be arranged on a same layer. Thus, the signal lines FT1, FT2 . . . FT6 and the gate lines or the signal lines FT1, FT2 . . . FT6 and the data lines 7 can be simultaneously formed in a single-patterning process, so as to reduce the processing procedures. The data lines 7 and the common electrodes 6 are separated by a second insulation layer 9.

In this embodiment, the display panel not only enables to display an image and support a pressure detection function, but also can realize a function of mutual-capacitance-type touch recognition. Alternatively, at a touch recognition stage, the voltage-fixed electrodes 3 also function as the touch sensing electrodes, and a predetermined portion of the common electrode 6 functions as the touch scanning electrodes, and are controlled by means of corresponding driving chips, so that the mutual-capacitance-type touch recognition may be implemented by the touch scanning electrodes and the touch sensing electrodes.

Figure 4:
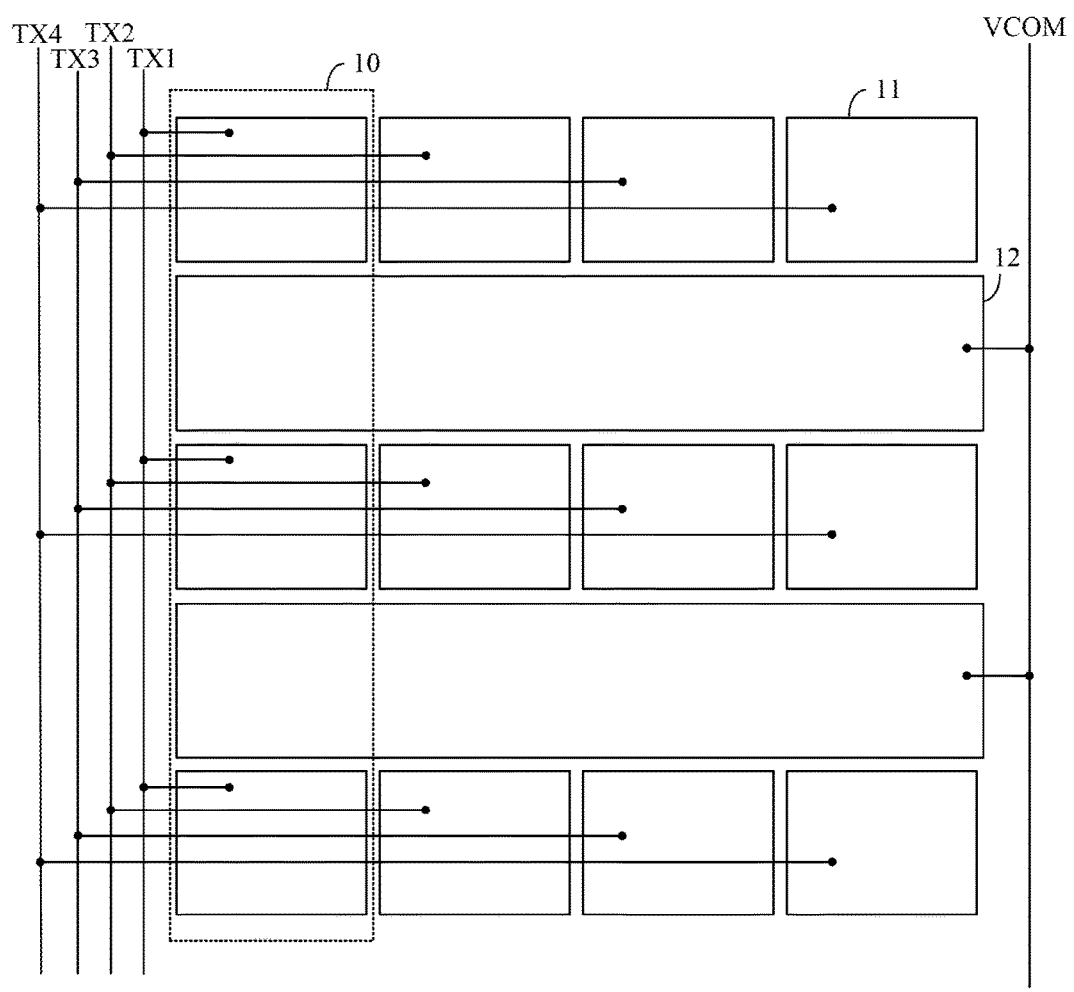
FIG. 4 is a top view showing a common electrode of FIG. 1.

FIG. 4 is a top view showing a common electrode in FIG. 1. As shown in FIG. 4, the common electrode includes a plurality of strip-like sub-electrodes 12 and a plurality of plate-like sub-electrodes 11. The strip-like sub-electrodes 12 extend in a first direction, and the strip-like sub-electrodes 12 and the voltage-fixed electrodes 3 are arranged in an opposite manner. All of the strip-like sub-electrodes 12 are electrically connected by a corresponding wire VCOM. All of the plate-like sub-electrodes 11 are arranged in an array manner, and an array formed by the plate-like sub-electrodes 11 is divided into a plurality of electrode groups 10. Each electrode group 10 includes a plurality of plate-like sub-electrodes 11 arranged in a second direction and all of the plate-like sub-electrodes 11 in the same electrode group 10 are electrically connected by means of the corresponding wires TX1, TX2 . . . TX4. Based on the above structure, at the touch recognition stage, the electrode groups 10 function as the touch scanning electrodes, and the first direction is not parallel to the second direction. In this embodiment, for example, the first direction is the horizontal direction and the second direction is the vertical direction.

Hereafter, the procedures for the operation of the display panel will be described in details in conjunction with the drawings. FIG. 5 illustrates a timing sequence for an operation of the display panel in FIG. 1. As shown in FIG. 5, the procedures include a display stage, a touch recognition stage and a pressure detection stage.

At the display stage, the gate scanning signals are inputted to the gate lines, and the data signals in the data lines 7 can be written into the pixel electrodes 5 in the corresponding pixel units by means of corresponding film transistors (not shown). At the same time, the common voltage signal is inputted to the common electrode 6. At this time, each pixel unit can function to display, so that the display panel can display an image.

At the touch recognition stage, the voltage-fixed electrodes 3 function as the touch sensing electrodes, and each of the electrode groups 10 in the common electrode 6 functions as the touch scanning electrode. The touch scanning signal is inputted to the touch scanning electrode, and each of the strip-like sub-electrodes 12 in the common electrode 6 maintains a common voltage. At this time, a mutual capacitance is formed between the touch scanning electrode and the touch sensing electrode.

At the pressure detection stage, the pressure scanning signal is inputted to the corresponding pressure sensing electrodes 4 by means of signal lines FT1, FT2 . . . FT6, and the pressure scanning signal is of a preset waveform. When the user's finger presses a certain area on the display panel, the capacitances between the corresponding voltage-fixed electrodes 3 (i.e., touch sensing electrodes) and the pressure sensing electrodes 4 are changed. At this time, a problem of Resistance-Capacitance (RC) delay may occur in the pressure sensing electrode 4. Compared with a waveform of the preset pressure scanning signal, the waveforms of the pressure sensing signals actually applied on the pressure sensing electrodes 4 are changed. The deformation of the first substrate can be calculated by measuring the pressure sensing signals actually applied on the pressure sensing electrodes 4, so as to obtain the pressure of the finger on the first substrate.

It should be noted that, in this embodiment, at the touch recognition stage and the pressure detection stage, scanning signals with predetermined frequencies may be inputted to the gate lines and the data lines 7 by the corresponding electronic chip, so as to prevent the data lines 7 from generating sensing voltages at the touch recognition stage and the pressure detection stage, and such sensing voltages may adversely influence the data signals in the data lines 7 at the display stage.

In addition, in this embodiment of the present disclosure, the pressure sensing electrodes 4 are made of ITO and the pressure sensing electrodes 4 and the pixel electrodes 5 are arranged on the same layer, which is for illustration purpose only, and do not limit the scope of the present disclosure. In the present disclosure, the pressure sensing electrodes 4 can be arranged in an independent layer and made of a metal, which is not shown in the drawings.

FIG. 6 is a flow chart showing a method for driving the above display panel according to at least one embodiment of the present disclosure. As shown in FIG. 6, the method includes a step S3: at the pressure detection stage, applying the fixed voltage to the voltage-fixed electrodes, and inputting pressure scanning signals to the pressure sensing electrodes, so as to generate the pressure sensing signals on the pressure sensing electrodes, thereby to determine by an electronic chip the pressure applied at the touch position according to the pressure sensing signals.

In step S3, when the user applies pressure on the first substrate, the first substrate is slightly deformed due to being pressed. Correspondingly, distances between the voltage-fixed electrodes and the pressure sensing electrodes may be changed so that values of the capacitances between them are changed accordingly. At the same time, since the fixed voltage is applied to the voltage-fixed electrodes, an influence of the user's finger on the pressure sensing electrodes 4 can be shielded, i.e., an influence of the finger on the mutual capacitances between the voltage-fixed electrodes 3 and the pressure sensing electrodes 4 can be effectively prevented. Hence, the distance between the deformed first substrate and the second substrate can be obtained by detecting the capacitance values to obtain a deformation quantity of the first substrate in the touch process, thereby to further obtain the pressure received by the first substrate and realize a pressure sensing.

Figure 7:
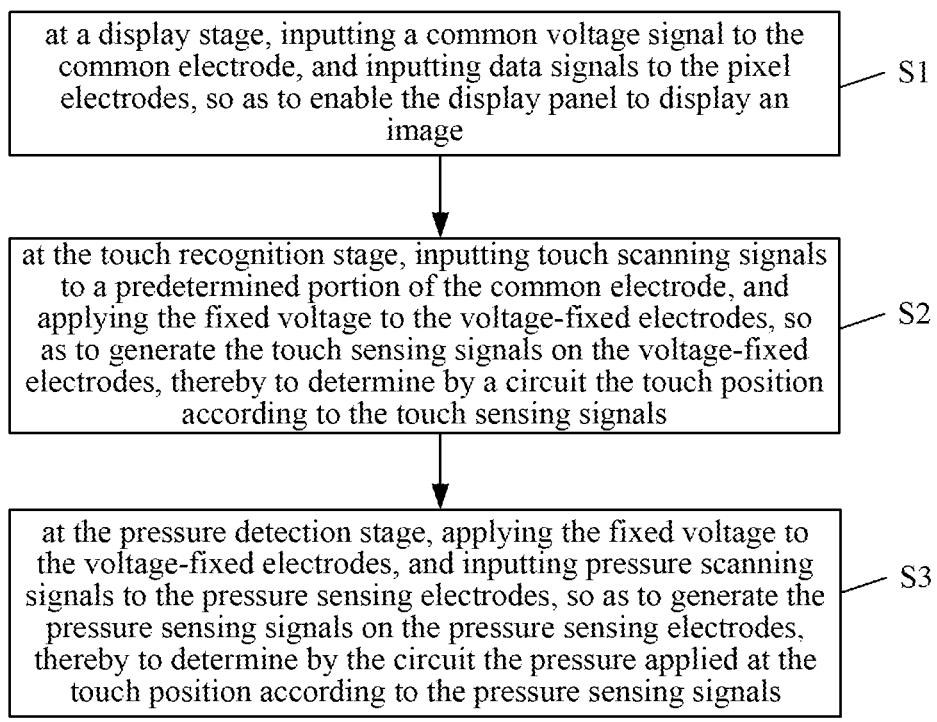
FIG. 7 is a flow chart showing another method for driving the display panel according to at least one embodiment of the present disclosure.

FIG. 7 is a flow chart showing another method for driving the display panel according to at least one embodiment of the present disclosure. As shown in FIG. 7, in this display panel, the second substrate further includes pixel electrodes and a common electrode that are arranged on the second base at the side facing the first substrate, and the pixel electrodes are arranged on the common electrode at a side that is farther away from the second base than the other side of the common electrode; and orthogonal projections of the pressure sensing electrodes on the second base are not overlapped with orthogonal projections of the pixel electrodes on the second base Besides the above step S3, the method further includes steps S1 and S2 prior to the step S3.

Step S1: at a display stage, inputting a common voltage signal to the common electrode, and inputting data signals to the pixel electrodes, so that the display panel is capable of displaying an image.

S2: at the touch recognition stage, inputting touch scanning signals to a predetermined portion of the common electrode, and applying the fixed voltage to the voltage-fixed electrodes, so as to generate the touch sensing signals on the voltage-fixed electrodes, thereby to determine by an electronic chip the touch position according to the touch sensing signals.

At the touch recognition stage, the predetermined portion of the common electrode functions as the touch scanning electrode, and the voltage-fixed electrodes functions as the touch sensing electrodes.

For details of the steps S1 and S2, it may refer to the above contents concerning "the display stage" and "the touch recognition stage" of the procedures for the operation of the display panel, which is not repeated herein.

By means of the above steps S1, S2 and S3, the display function, the touch recognition function and the pressure detection function can be realized.

The present disclosure further provides a display device including the above display panel, and a detailed explanation of the above display panel is not repeated herein.

It should be noted that, the above embodiments are only used to illustrate the principle of the present disclosure, but the present disclosure is not limited thereto. Obviously, a person skilled in the art may make further modifications and improvements without departing from the spirit and scope of the present invention, and these modifications and improvements shall also fall within the scope defined by the attached claims.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display panel comprising: a first substrate and a second substrate arranged opposite to each other, wherein the first substrate comprises: a first base, and voltage-fixed electrodes that are arranged on the first base at a side facing the second substrate, wherein a fixed voltage is applied to each of the voltage-fixed electrodes; and the second substrate comprises: a second base, and pressure sensing electrodes that are arranged on the second base at a side facing the first substrate, wherein the pressure sensing electrodes are arranged opposite to the voltage-fixed electrodes respectively, and each pressure sensing electrode is configured to detect a pressure applied at a touch position on the display panel according to a capacitance between the pressure sensing electrode and the corresponding voltage-fixed electrode at a pressure detection stage, wherein the second substrate further comprises pixel electrodes and a common electrode that are arranged on the second base at the side facing the first substrate, and the pixel electrodes are arranged on the common electrode at a side that is farther away from the second base than the other side of the common electrode; and orthogonal projections of the pressure sensing electrodes on the second base are not overlapped with orthogonal projections of the pixel electrodes on the second base;

at a touch recognition stage, the voltage-fixed electrodes function as the touch sensing electrodes, and a predetermined portion of the common electrode functions as touch scanning electrodes;

the common electrode comprises a plurality of strip-like sub-electrodes and a plurality of plate-like sub-electrodes, and the strip-like sub-electrodes extend in a first direction;

the strip-like sub-electrodes are arranged opposite to the voltage-fixed electrodes, all of the plate-like sub-electrodes are arranged in an array including a plurality of electrode groups, and each of the electrode groups comprises a plurality of plate-like sub-electrodes arranged in a second direction and electrically connected to each other; and at the touch recognition stage, the electrode groups function as the touch scanning electrodes.

2. The display panel according to claim 1, wherein the pressure sensing electrodes and the pixel electrode are arranged on a same layer.

3. The display panel according to claim 2, wherein the second substrate further comprises signal lines, wherein the signal lines are connected to the pressure sensing electrodes through via holes respectively, and configured to input pressure scanning signals to the pressure sensing electrodes and transmit pressure sensing signals generated by the pressure sensing electrodes to an electronic chip, so that the electronic chip determines the pressure applied at the touch position according to the pressure sensing signals.

4. The display panel according to claim 3, wherein the second substrate further comprises gate lines and data lines, wherein the signal lines and the gate lines are arranged on a same layer or the signal lines and the data lines are arranged on a same layer.

5. The display panel according to claim 1, wherein a value of the fixed voltage is in a range from 1V to 3V.

6. The display panel according to claim 1, wherein both the voltage-fixed electrodes and the pressure sensing electrodes are made of metal.

7. The display panel according to claim 1, wherein both the voltage-fixed electrodes and the pressure sensing electrodes are of a grid shape.

8. The display panel according to claim 1, wherein the first substrate is a color filter substrate, and the second substrate is an array substrate.

9. The display panel according to claim 4, wherein the pixel electrodes are separated from the common electrode by a first insulation layer, and the data lines are separated from the common electrode by a second insulation layer.

10. The display panel according to claim 1, wherein an orthogonal projection of the pressure sensing electrode onto the second base coincides with an orthogonal projection of the corresponding voltage-fixed electrode onto the second base.

11. A method for driving a display panel, wherein the display panel comprises a first substrate and a second substrate arranged opposite to each other, wherein the first substrate comprises: a first base, and voltage-fixed electrodes that are arranged on the first base at a side facing the second substrate, wherein a fixed voltage is applied to each of the voltage-fixed electrodes; and the second substrate comprises: a second base, and pressure sensing electrodes that are arranged on the second base at a side facing the first substrate, wherein the pressure sensing electrodes are arranged opposite to the voltage-fixed electrodes respectively, and each pressure sensing electrode is configured to detect a pressure applied at a touch position on the display panel according to a capacitance between the pressure sensing electrode and the corresponding voltage-fixed electrode at a pressure detection stage, wherein the second substrate further comprises pixel electrodes and a common electrode that are arranged on the second base at the side facing the first substrate, and the pixel electrodes are arranged on the common electrode at a side that is farther away from the second base than the other side of the common electrode; and orthogonal projections of the pressure sensing electrodes on the second base are not overlapped with orthogonal projections of the pixel electrodes on the second base;

at a touch recognition stage, the voltage-fixed electrodes function as the touch sensing electrodes, and a predetermined portion of the common electrode functions as touch scanning electrodes;

the common electrode comprises a plurality of strip-like sub-electrodes and a plurality of plate-like sub-electrodes, and the strip-like sub-electrodes extend in a first direction;

the strip-like sub-electrodes are arranged opposite to the voltage-fixed electrodes, all of the plate-like sub-electrodes are arranged in an array including a plurality of electrode groups, and each of the electrode groups comprises a plurality of plate-like sub-electrodes arranged in a second direction and electrically connected to each other; and at the touch recognition stage, the electrode groups function as the touch scanning electrodes, the method comprises:
at the pressure detection stage, applying the fixed voltage to the voltage-fixed electrodes, and inputting pressure scanning signals to the pressure sensing electrodes, so as to generate the pressure sensing signals on the pressure sensing electrodes, thereby to determine by an electronic chip the pressure applied at the touch position according to the pressure sensing signals.

12. A method for driving a display panel, wherein the display panel comprises a first substrate and a second substrate arranged opposite to each other, wherein the first substrate comprises: a first base, and voltage-fixed electrodes that are arranged on the first base at a side facing the second substrate, wherein a fixed voltage is applied to each of the voltage-fixed electrodes; and the second substrate comprises: a second base, and pressure sensing electrodes that are arranged on the second base at a side facing the first substrate, wherein the pressure sensing electrodes are arranged opposite to the voltage-fixed electrodes respectively, and each pressure sensing electrode is configured to detect a pressure applied at a touch position on the display panel according to a capacitance between the pressure sensing electrode and the corresponding voltage-fixed electrode at a pressure detection stage, wherein the second substrate further comprises pixel electrodes and a common electrode that are arranged on the second base at the side facing the first substrate, and the pixel electrodes are arranged on the common electrode at a side that is farther away from the second base than the other side of the common electrode; and orthogonal projections of the pressure sensing electrodes on the second base are not overlapped with orthogonal projections of the pixel electrodes on the second base, at a touch recognition stage, the voltage-fixed electrodes function as the touch sensing electrodes, and a predetermined portion of the common electrode functions as touch scanning electrodes, the common electrode comprises a plurality of strip-like sub-electrodes and a plurality of plate-like sub-electrodes, and the strip-like sub-electrodes extend in a first direction;

the strip-like sub-electrodes are arranged opposite to the voltage-fixed electrodes, all of the plate-like sub-electrodes are arranged in an array including a plurality of electrode groups, and each of the electrode groups comprises a plurality of plate-like sub-electrodes arranged in a second direction and electrically connected to each other; and at the touch recognition stage, the electrode groups function as the touch scanning electrodes, the method comprises:

at a display stage, inputting a common voltage signal to the common electrode, and inputting data signals to the pixel electrodes, so as to enable the display panel to display an image;

at the touch recognition stage, inputting touch scanning signals to a predetermined portion of the common electrode, and applying the fixed voltage to the voltage-fixed electrodes, so as to generate the touch sensing signals on the voltage-fixed electrodes, thereby to determine by an electronic chip the touch position according to the touch sensing signals; and at the pressure detection stage, applying the fixed voltage to the voltage-fixed electrodes, and inputting pressure scanning signals to the pressure sensing electrodes, so as to generate the pressure sensing signals on the pressure sensing electrodes, thereby to determine by the electronic chip the pressure applied at the touch position according to the pressure sensing signals.

13. A display device comprising the display panel according to claim 1.

14. The display device according to claim 13, wherein the pressure sensing electrodes and the pixel electrode are arranged on a same layer.

15. The display device according to claim 14, wherein the second substrate further comprises signal lines, wherein the signal lines are connected to the pressure sensing electrodes through via holes respectively, and configured to input pressure scanning signals to the pressure sensing electrodes and transmit the pressure sensing signals generated by the pressure sensing electrodes to an electronic chip, so that the electronic chip determines the pressure applied at the touch position according to the pressure sensing signals.

16. The display device according to claim 15, wherein the second substrate further comprises gate lines and data lines, wherein the signal lines and the gate lines are arranged on a same layer or the signal lines and the data lines are arranged on a same layer.

17. The display device according to claim 13, wherein a value of the fixed voltage is in a range from 1V to 3V.

18. The display device according to claim 13, wherein both the voltage-fixed electrodes and the pressure sensing electrodes are made of metal.

19. The display device according to claim 13, wherein both the voltage-fixed electrodes and the pressure sensing electrodes are of a grid shape.

20. The display device according to claim 13, wherein the first substrate is a color filter substrate, and the second substrate is an array substrate.

* * * * *